United States Patent
Moore et al.

(10) Patent No.: US 8,332,380 B2
(45) Date of Patent: Dec. 11, 2012

(54) VARIABLE DENSITY QUERY ENGINE

(75) Inventors: Martin T. Moore, Westford, MA (US);
James K. Kebinger, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/907,002

(22) Filed: Oct. 18, 2010

(65) Prior Publication Data
US 2011/0040742 A1     Feb. 17, 2011

Related U.S. Application Data

(62) Division of application No. 11/612,100, filed on Dec. 18, 2006, now Pat. No. 7,818,316.

(51) Int. Cl.
*G06F 17/30* (2006.01)

(52) U.S. Cl. ........ 707/706; 707/722; 707/736; 707/758; 707/790

(58) Field of Classification Search ........... 707/600–899
See application file for complete search history.

(56) References Cited

U.S. PATENT DOCUMENTS

| | | | |
|---|---|---|---|
| 6,108,650 A * | 8/2000 | Musk et al. | 1/1 |
| 2005/0177303 A1* | 8/2005 | Han | 701/209 |
| 2008/0082486 A1* | 4/2008 | Lermant et al. | 707/3 |

* cited by examiner

*Primary Examiner* — Isaac M Woo
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to search engines and provide a novel and non-obvious method, system and computer program product for a variable density query engine. In an embodiment of the invention, a search engine data processing system can be provided. The system can include a content index, and a variable density search engine coupled to the content index. The variable density search engine can include program code enabled to vary a density of entries in a result set according to a varying size of the result set. In this regard, in one aspect of the embodiment, the density can range from a title for each entry in the result set to a full textual description for each entry in the result set to an audiovisual element for each entry in the result set.

5 Claims, 2 Drawing Sheets

310 | X | Search Engine - http://www.searchengine.com

Search | del———330 | GO | 320

Results 1 - 5 of 1,300    340

1. Delaware - State of Delaware Official Site    350

2. Del Sol - Fine Manufacturers of Beverages

3. Del Toro Computers - Retail Direct to the Customer

4. Delta Force - A Historical View of the Fighting Force

5. Delmarva Knights - High School Football Home Page

[Previous] [Next]

⬇

310 | X | Search Engine - http://www.searchengine.com

Search | delta———330 | GO | 320

Results 1 - 2 of 52    340

1. Delta Faucets - Delta Faucets is a leading manufacturer of faucets. The new imperial model is a hot seller. The facet comes in brushed satin or a nickel finish -- See photo: 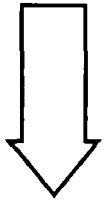 350

2. Delta Airlines - 1,300 Flights Daily. Delta has a fleet of airplanes that includes 737s, 757s and 767s. A photo of our newest airplane:

[Previous] [Next]

FIG. 3

VARIABLE DENSITY QUERY ENGINE

CROSS-REFERENCE TO RELATED APPLICATIONS

This application is a Divisional of U.S. application Ser. No. 11/612,100, filed Dec. 18, 2006, entitled "VARIABLE DENSITY QUERY ENGINE," the entirety of which is incorporated herein by reference.

BACKGROUND OF THE INVENTION

1. Field of the Invention

The present invention relates to the field of content searching and more particularly to results presentation in a query engine.

2. Description of the Related Art

Information systems such as database systems have fulfilled a substantial role in computing from the start. From the most basic data driven application, to complex database management systems, end users have always benefited from the ability to cull a subset of desired data from a large corpus of data based upon one or more search terms. Largely due to the efficiency and speed of database systems, whole industries have experienced dramatic gains in efficiency based upon the ability to retrieve desired record sets from vast collections of data.

The advent of the Internet has further accelerated the adoption of information systems among the consuming public. Prior to the wide-scale adoption of Internet based computing, database systems could be accessed and utilized only by a select group of users and the available content for consumption naturally was limited to that which could be provided by the select group of users. The explosion of the Internet through the deployment of the World Wide Web, however, lifted the intrinsic barrier to content contribution resulting in a literal sea of information.

The World Wide Web has resulted in such a volume of content available for viewing over the Internet, that in the absence of search engine technologies, users would be unable to locate content of interest. Fortunately, the development of search engine technology provides an intuitive mechanism for locating content of interest in response to basic Boolean queries. Advanced forms of the search engine provide for natural language searching thereby eliminating the need for users to formulate complex Boolean query strings. Nevertheless, depending upon the nature of a particular query, the result set produced by the query can be of little help and the onus of developing an effective query string for content of interest remains with the end user.

All search engines respond to query strings in the same way. The query string is parsed, interpreted and applied against a database of known content to produce a result set. The result set typically is rendered within one or more Web pages, each result in the result set being hyperlinked to corresponding content. Obviously, the broader the query string, the more results that will be presented in the result set. Differentiating one result from the next in the result set, therefore, can be challenging and can defeat the intent of the search. Furthermore, the iterative refinement of the query string to reduce the size of the result set to a manageable few results can be tedious at best. Of course, for each search iteration, the query string must be transmitted to the search engine, processed, and a new result set rendered in the content browser for viewing by the end user.

Notably, the display or information density of descriptive information in a result in a result set can vary by user preference from search engine to search engine. For many commercial search engine embodiments, the density of information can range from a mere hyperlink to corresponding content, to an abstract and photos pertaining to the corresponding content. In all cases, however, once a density level has been selected by an end user, all results in a result set will provide the same level of information density, irrespective of the quality of the query string or the volume of results in a result set. Accordingly, selecting too dense a setting will produce too many Web pages for too many results thereby defeating the ability of the end user to quickly digest the result set. Conversely, too sparse a setting will produce too little information so that a cursory inspection of the results in the result set will not help the end user in refining the search terms in the query string.

BRIEF SUMMARY OF THE INVENTION

Embodiments of the present invention address deficiencies of the art in respect to search engines and provide a novel and non-obvious method, system and computer program product for a variable density query engine. In an embodiment of the invention, a search engine data processing system can be provided. The system can include a content index, and a variable display density search engine coupled to the content index. The variable display density search engine can include program code enabled to vary a display density of entries in a result set according to a varying size of the result set. In this regard, in one aspect of the embodiment, the density can range from a title for each entry in the result set to a full textual description for each entry in the result set to an audiovisual element for each entry in the result set.

In another embodiment of the invention, a variable density query processing method can be provided. The method can include receiving a query string for processing against a keyword searchable content index, and processing the query string to produce a result set of entries for the query string. The method further can include computing a result set size for the result set, determining a density corresponding to the computed result set size, and limiting each entry in the result set to the determined density. Finally, the method can include rendering the result set. Notably, the method can include modifying the query string. As such, responsive to modifying the query string, the modified query string can be processed to produce a of entries in a different result set. Thereafter, a result set size can be computed for the different result set a new density can be determined corresponding to the computed result set size. Finally, each entry in the different result set can be limited to the determined density and the different result set can be rendered.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for variable density searching in a search engine. In accordance with an embodiment of the present invention, a search engine interface can be provided. Query strings can be provided through the search engine interface and query results of variable density can be provided through the search engine interface responsive to the entry of query characters through the search engine interface. In this regard, as additional characters are provided in a query string, a search can be performed against a search engine database and a result set can be rendered. The informational density of each entry in the result set, however, can increase as the result set narrows in size. In this way, end users can more quickly ascertain the effectiveness of a query string in order to better tailor the query string in real time to produce a desired result set.

Figure 1:
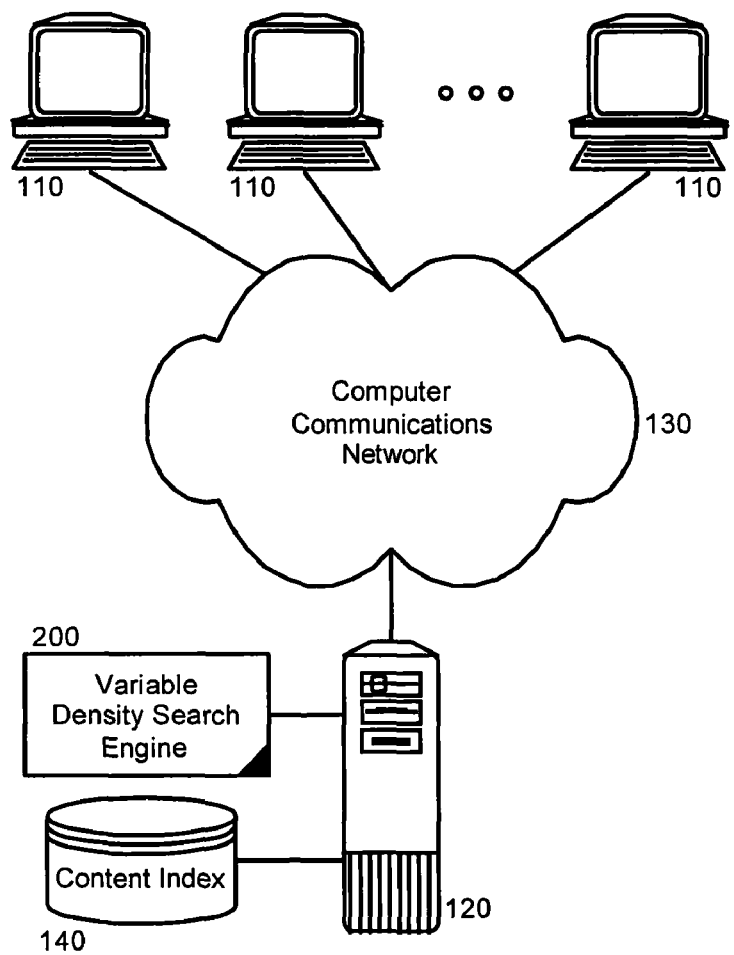
FIG. 1 is a schematic illustration of a search engine data processing system configured to perform a variable density search.

In further illustration, FIG. 1 is a schematic illustration of a search engine data processing system configured to perform a variable density search. The system can include a host computing platform 120 configured for coupling to one or more client computing platforms 110 over a computer communications network 130. The host computing platform 120 can include a content index 140 having stored thereon data records pertaining to keyword searchable content disposed about the computer communications network 130. In this regard, the content index 140 can be a keyword searchable index produced in consequence of Web crawling activities as it is well-known in the art.

Notably, a variable density search engine 200 can be coupled to the host computing platform 120 and to the content index 140. The variable density search engine 200 can include program code enabled to process query strings as keyword search requests against the content index 140. The keyword search requests can range from single word query strings to multi-word query strings processed according to Boolean operators to natural language strings. The program code can be further enabled to provide a result set of result entries in response to receipt of a query string or any portion thereof.

Importantly, unlike conventional search engine logic, the program code of the variable density search engine 200 can be enabled to tailor the density of each entry in the result set according to the number of entries in the result set. For large result sets, the density of each entry can be limited to a title or basic hyperlink to corresponding content. For medium result sets, the density of each entry can include not only a title and hyperlink, but also some descriptive text. Finally, for very small result sets, the density of each entry can be less restricted and can include not only a full textual description of the content corresponding to the entry, but also multimedia elements such as imagery and audio. In all cases, however, the density of the entries in the result set can change dynamically in response to the production refined result sets produced in response to the addition of characters in the query string.

Figure 2:
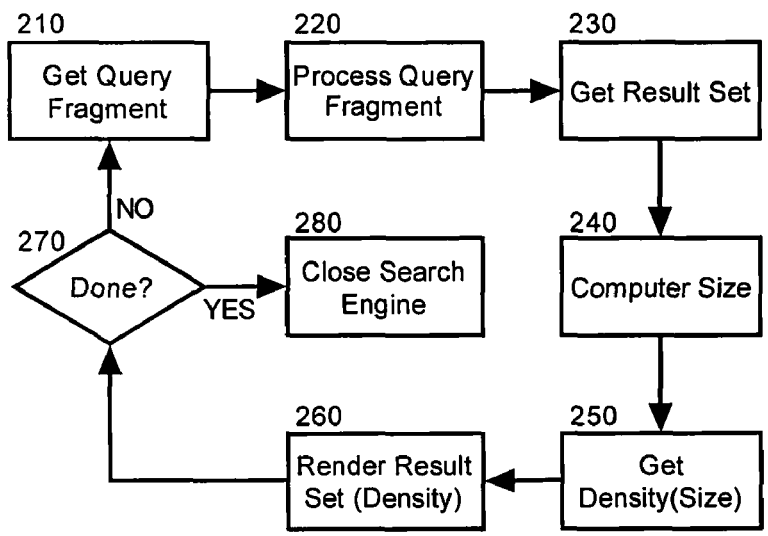
FIG. 2 is a flow chart illustrating a process for variable density searching; and, FIG. 3 is a pictorial illustration of a search engine configured for variable density searching.

In further illustration, FIG. 2 is a flow chart illustrating a process for variable density searching. The process can begin in block 210 in which a query string fragment can be received. The fragment can range from a character or characters to complete words or Boolean expressions. Regardless, in block 220, the query fragment can be processed against a content index to generate a result set. In block 230, the result set can be retrieved and the size of the result set can be computed in block 240. In block 250, a preferred density can be determined based upon the computed size of the result set. Thereafter, in block 260, the determined density can be applied to the entries of the result set and rendered for review by an end user. Finally, in decision block 270, if the search has completed, the process can end in block 280. Otherwise, the process can repeat through block 210.

End users can interact with the variable density search engine through a defined user interface. In reference to FIG. 3 the user interface 310 can include a text input field 320 into which a query string 330 can be specified. The entries of a result set 350 produced through the processing the query string 330 can be provided in a results frame 340. As it will be apparent from the exemplary user interface sequence of FIG. 3, for large result sets, the density of entries in the result set 350 can be reduced. Notwithstanding, as the query string 330 is refined, the density of the entries in the result set 350 can be increased, even to include audio and visual elements as illustrated in the exemplary user interface sequence of FIG. 3.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A search engine data processing system comprising:
   a content index; and,
   a variable density search engine coupled to the content index, the variable density search engine comprising program code enabled to vary a density of entries in a result set according to a varying size of the result set.

2. The system of claim 1, wherein the density ranges from a title for each entry in the result set to a full textual description for each entry in the result set.

3. The system of claim 1, wherein the density ranges from a title for each entry in the result set to a full textual description in addition to an audiovisual element for each entry in the result set.

4. The system of claim 1, wherein the content index is a keyword searchable content index.

5. The system of claim 1, further comprising a Web crawler configured to produce the content index.

* * * * *